United States Patent [19]
Williams

[11] 3,726,366
[45] Apr. 10, 1973

[54] AUTOMATIC STABILIZER FOR POWERED IRRIGATION PIPE LINES

[76] Inventor: Leonard H. Williams, P.O. Box 233, Hermiston, Oreg. 97838

[22] Filed: Dec. 11, 1970

[21] Appl. No.: 97,262

[52] U.S. Cl. ............................... 188/6, 137/344
[51] Int. Cl. ............................... A01g 25/02
[58] Field of Search ............... 248/49, 354 R; 188/6; 280/298, 301, 150.5; 239/212; 137/344

[56] References Cited

UNITED STATES PATENTS

| | | | |
|---|---|---|---|
| 602,134 | 4/1898 | Hawkes | 280/298 X |
| 1,066,854 | 7/1913 | Siverd | 188/6 |
| 3,255,968 | 6/1966 | Stafford | 248/49 X |
| 611,374 | 9/1898 | Bundick | 280/298 |
| 514,815 | 2/1884 | Davis et al. | 248/254 X |
| 1,394,737 | 10/1921 | Keesler | 280/150.5 X |
| 3,161,390 | 12/1964 | Larson | 248/288 X |
| 3,230,969 | 1/1966 | Purtell | 137/344 X |

FOREIGN PATENTS OR APPLICATIONS 1,000,078  2/1952  France

*Primary Examiner*—Roy D. Frazier
*Assistant Examiner*—Rodney H. Bonck
*Attorney*—Oliver D. Olson

[57] ABSTRACT

An elongated stabilizer arm is mounted pivotally at one end on a support adapted to be secured to an irrigation pipe supported above the ground by spaced wheels, with the pivot axis disposed in a vertical plane and extending obliquely with respect to the longitudinal dimension of the pipe, whereby the arm is movable laterally downward to opposite sides of the pipe for engagement of its opposite end with the ground. A spring interengages the support and arm for urging the latter to a rest position parallel to the pipe, the arm being movable to said lateral ground-engaging positions by a predetermined velocity of wind reacting against the arm.

5 Claims, 3 Drawing Figures

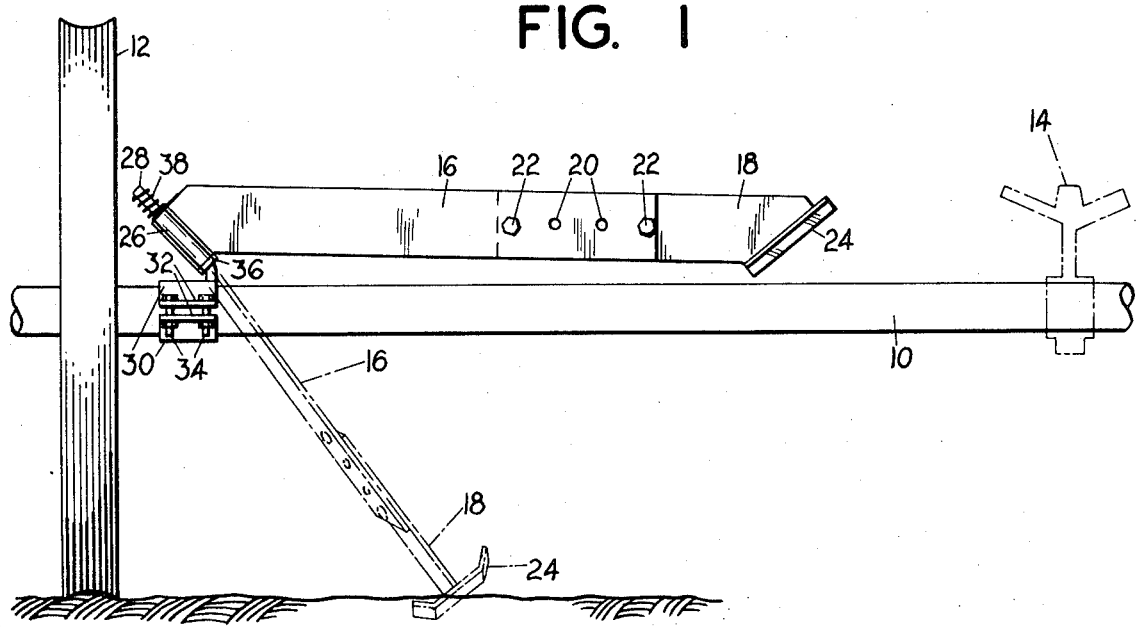
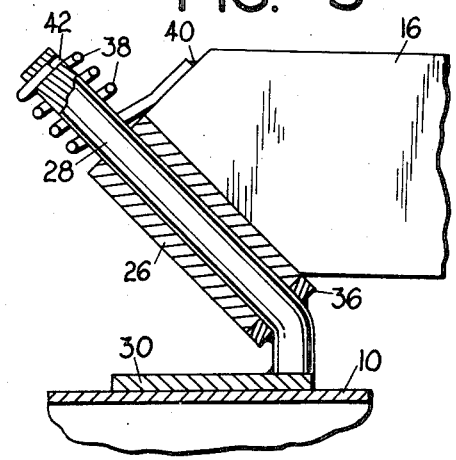
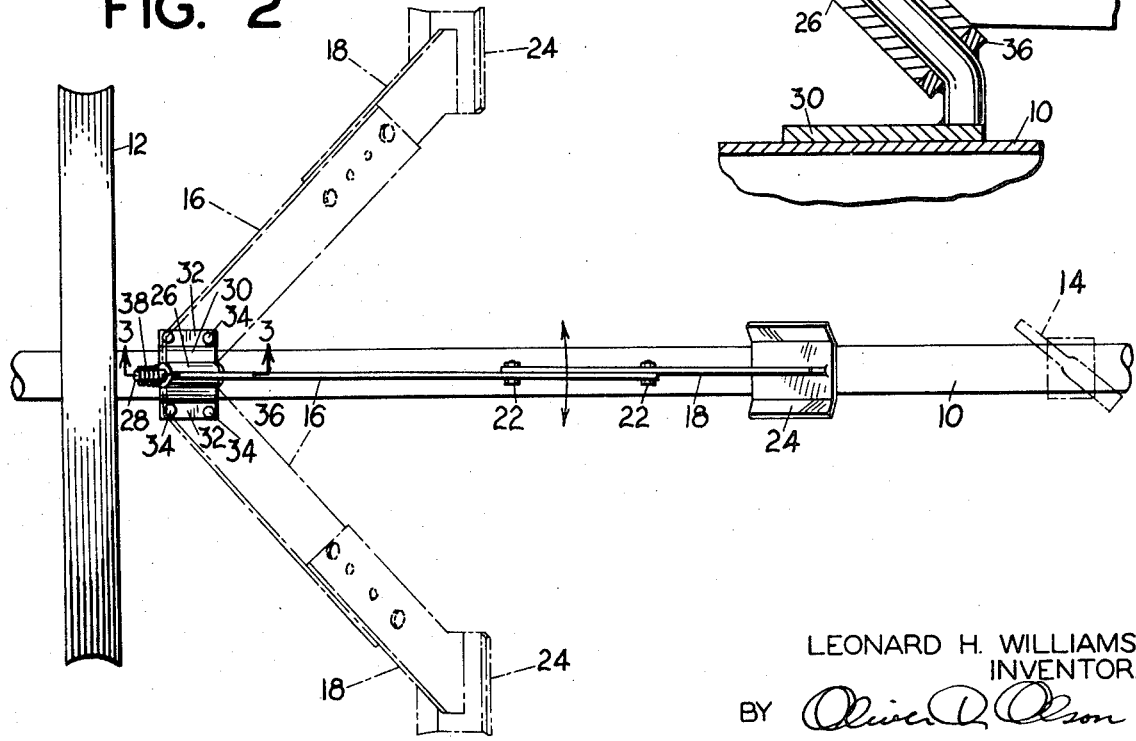

AUTOMATIC STABILIZER FOR POWERED IRRIGATION PIPE LINES

BACKGROUND OF THE INVENTION

This invention relates to irrigation systems, and more particularly to novel means for stabilizing wheel-supported irrigation pipe lines against movement by winds.

There are many types of sprinkler irrigation systems presently in use for supplying water to crops. One such type which is in wide spread use comprises an elongated irrigation pipe mounting a multiplicity of longitudinally spaced sprinkler heads and supported above the ground by a plurality of longitudinally spaced wheels. The pipe line is made up of a plurality of interconnected sections, and often exceeds several hundred feet in length. There is generally provided intermediate the ends of the pipe a power-driven wheeled unit which facilitates moving the assembly to various positions. Provision usually is made for draining the pipe system automatically when the water supply is shut off. This is provided primarily to lighten and thus facilitate moving of the assembly. However, the system frequently is maintained in a given position for extended periods of time and operated only intermittently in accordance with irrigation requirements. Thus, when the system is shut off, the drained assembly is quite light in weight and thus is susceptible of being moved in the direction perpendicular to the longitudinal dimension of the pipe by winds when the latter reach predetermined velocities. Such movement often results in severe damage to the irrigation system.

Means have been provided heretofore for stabilizing such pipe line assemblies against movement by winds. One such stabilizer comprises an elongated bar provided at one end with a saddle member adapted to rest upon the irrigation pipe, with the opposite end extending laterally downward for engagement with the ground. This form of stabilizer generally is utilized in pairs extending to opposite lateral sides of the irrigation pipe. This not only involves a duplication of cost, but it also doubles the requirements of storage space, transport to and from the field and manual manipulation of installing and dismantling. Moreover, the saddles merely rest upon the irrigation pipe and thus do not prevent the latter from rotating. The pipe and wheel assembly of the irrigation system thus may climb over the operative stabilizer arm, in the event of high gusts of wind.

Another form of stabilizer provided heretofore is an elongated stabilizer arm connected pivotally to the irrigation pipe for downward lateral extension to one side or the other of the irrigation pipe. These require manual setting to the side opposing the direction of wind. Moreover, in the event of a shift of wind direction the operator is required manually to shift each stabilizer arm to the opposite side. This not only requires substantially continuous surveillance, but also requires the operator to walk to each stabilizer arm in order to change its position. Since many irrigation systems involve irrigation pipes of several hundred feet in length, the walking distances are considerable.

Moreover, considerable irrigation time is lost during moving the system, due to the time required for an operator to walk to the stabilizer and disengage them from the ground.

SUMMARY OF THE INVENTION

In its basic concept the present invention provides a stabilizer arm adapted to be mounted on an irrigation pipe for pivotal movement on an axis disposed in a vertical plane and extending obliquely with respect to the longitudinal dimension of the pipe, for moving the arm pivotally downwardly to opposite lateral sides of the pipe for engagement with the ground. In the preferred embodiment, resilient means interengages the stabilizer arm and its fixed mounting on the pipe such that the arm is urged resiliently to a rest position substantially parallel to the pipe, the arm being movable to said lateral positions against the resistance of said resilient means by a predetermined velocity of wind reacting against the arm.

It is by virtue of the foregoing basic concept that the principal objective of this invention is achieved; namely, to overcome the aforementioned disadvantages of prior stabilizers.

The foregoing and other objects and advantages of this invention will appear from the following detailed description, taken in connection with the accompanying drawing of a preferred embodiment.

BRIEF DESCRIPTION OF THE DRAWING

FIG. 1 is a fragmentary view in side elevation of a portion of an irrigation system having incorporated therewith a stabilizer embodying the features of the present invention, the stabilizer being shown in rest position in full lines and in operative position in broken lines.

FIG. 2 is a fragmentary plan view as viewed from the top in FIG. 1.

FIG. 3 is a fragmentary sectional view taken on the line 3—3 in FIG. 2.

DESCRIPTION OF THE PREFERRED EMBODIMENT

For purposes of illustration there is shown in the drawings a portion of a conventional type of sprinkler irrigation system which includes a length of irrigation pipe 10 supported above the ground on laterally spaced wheels 12. Disposed at longitudinal intervals along the irrigation pipe are a plurality of rotary sprinkler heads 14 each of which usually is provided with an automatic drain component, as previously mentioned. As explained hereinbefore, the pipe is of considerable length, being made up of a plurality of interconnected sections, and supported by a plurality of longitudinally spaced wheels. Intermediate the ends of the pipe there generally is provided a power-driven wheeled unit to facilitate movement of the assembly.

Generally, the lengths of pipe and their couplings are made of light-weight aluminum for easy transport and assembly, and each supporting wheel comprises a circular rim of minimum cross-sectional dimensions and a multiplicity of wire type spokes, to minimize the weight.

The stabilizer of this invention includes an elongated stabilizer arm. In the preferred embodiment illustrated, the stabilizer arm is formed of two sections 16 and 18. Portions of each section are overlapped to provide registration of transverse openings 20 through the sections for the reception of connecting bolts 22. By this means the overall length of the arm may be varied to accommodate different diameter supporting wheels 12 which, conventionally, range between 4 and 6 feet.

The stabilizer arm is provided at one end with a ground-engaging foot 24 and means is provided for supporting the arm at the opposite end on an irrigation pipe for pivotal movement relative thereto. In the embodiment illustrated said opposite end is provided with a hollow sleeve 26 adapted to receive therethrough an elongated pivot shaft 28. Support means is provided for the pivot shaft 28 for mounting the latter on an irrigation pipe. In the embodiment illustrated the support means comprises a pair of substantially semi-circular clamp members 30 each provided with laterally extending flanges 32. The flanges are provided with registering openings for the reception of clamp bolts 34. The clamp members are proportioned to engage about an irrigation pipe and to be secured thereto by tightening the clamp bolts.

The pivot shaft 28 is secured to one of the clamp members 30 and its axis projects therefrom at an oblique angle with respect to, and in a plane substanially parallel to the longitudinal axis of the irrigation pipe, i.e., obliquely with respect to the longitudinal axis of the clamp members comprising the support means.

The clamp members 30 are mounted on the irrigation pipe such that the pivot shaft 28 is disposed in a vertical plane when the irrigation system is in operative position. In the embodiment illustrated, the pivot shaft extends obliquely upward from the irrigation pipe. However, it will be recognized that it may be arranged to extend obliquely downward from the pipe, if desired.

The sleeve 26 is supported pivotally on the shaft 28 in abutment with the annular collar 36. Accordingly, the pivot axis of the sleeve also is disposed at an oblique angle with respect to the longitudinal dimension of the stabilizer arm. In the embodiment illustrated this angle is chosen so that in the inoperative, rest position of adjustment of the arm the latter extends substantially parallel to the irrigation pipe, as illustrated in full lines in FIG. 1.

The oblique arrangement of the pivot axis allows the stabilizer arm to be pivoted laterally downward to either side of the irrigation pipe to bring the ground-engaging foot 24 into contact with the ground. In this operative position the stabilizer arm functions to prevent displacement of the irrigation pipe and wheel assembly from a desired position of adjustment.

Although the stabilizer assembly described hereinbefore may be utilized effectively for the purpose intended, by manual manipulation, it is preferred that means be provided by which the stabilizer arm is moved to stabilizing position automatically in response to the development of winds of such velocities as might tend to cause displacement of the irrigation system. In the embodiment illustrated, this automatic operation is provided by means of a resilient interconnection between the stabilizer arm and the pivot support. In the specific embodiment illustrated, a coil spring 38 encircles the portion of the pivot shaft 28 projecting from the sleeve 26. One end of the coil spring is secured to the stabilizer arm, as by means of welding 40, and the opposite end of the spring is secured releasably to the pivot shaft, as by seating it in a transverse bore 42 in the shaft.

The spring 38 is arranged to be in relaxed condition when the stabilizer arm is in the normal rest position illustrated in full lines in the drawing, extending substantially parallel to the irrigation pipe. Thus, pivotal movement of the stabilizer arm laterally to either side of the pipe is resisted resiliently by the coil spring. However, the strength of the coil spring is chosen to allow such pivotal movement of the arm to the operative, ground-engaging positions illustrated in broken lines in FIG. 2, in response to wind velocities of a predetermined magnitude reacting against the side surfaces of the arm. For this purpose the arm is made sufficiently wide to serve as a vane, i.e., it is provided with adequate surface area against which the wind may react.

It will be apparent that when wind velocities reach a magnitude, for example about 25 miles per hour, which would cause displacement of the irrigation pipe assembly, the stabilizer arm is pivoted to the proper operative position to resist such displacement. Accordingly, the stabilizer system operates automatically, requiring no personal attendance. Moreover, since the stabilizer arm is clamped securely to the irrigation pipe, it prevents rotation of the latter when the arm is in ground-engaging position. This further resists displacement of the irrigation pipe assembly.

When the wind velocity decreases below a predetermined magnitude, the spring 38 causes the stabilizer arm to be moved back to the rest position previously described. In this position it is out of the way and thus allows the irrigation pipe assembly to be moved to various other locations without personal attendance.

It will be apparent from the foregoing description that the present invention provides simplified and therefore economical means by which to provide automatic stabilization of wheel-supported sprinkler irrigation systems. In this regard a single stabilizer arm functions in response to wind velocities of a predetermined magnitude to move to the appropriate side of the pipe to effect stabilization. The stabilizer is attached to and detached from irrigation pipe with speed and facility and accommodates use with systems having supporting wheels and irrigation pipe of varying diameters.

It will be apparent to those skilled in the art that various changes in the size, shape, number, type and arrangement of parts described hereinbefore may be made without departing from the spirit of this invention.

Having now described my invention and the manner in which it may be used, I claim:

1. In combination with an irrigation assembly including an irrigation pipe supported above the ground on spaced wheels, a stabilizer for preventing movement of the assembly perpendicular to the longitudinal dimension of the pipe, comprising:
   a. an elongated stabilizer arm having a ground-engaging end and a mounting end, and
   b. pivot means engaging the mounting end of the arm and arranged to be secured to the irrigation assembly with the axis of the pivot means extending obliquely with respect to and in a plane substantially parallel to the longitudinal axis of the irrigation pipe, for moving the arm pivotally downward selectively to opposite lateral sides of the pipe for engagement of the ground-engaging end of the arm with the ground, the pivot means comprising a pivot shaft and a pivot bore on the mounting end of the arm receiving the pivot shaft therein.

2. The combination of claim 1 including a coil spring encircling the pivot shaft and engaged at its opposite ends with the pivot shaft and arm, respectively, urging the latter resiliently to a rest position substantially parallel to the pipe, the arm being movable from said rest position to said lateral positions against the resistance of said coil spring by a predetermined velocity of wind reacting against the arm.

3. The combination of claim 1 including pivot support means arranged to be secured removably to the irrigation assembly.

4. The combination of claim 3 wherein the pivot support means comprises clamp means adapted to be secured releasably about the pipe.

5. In combination with an irrigation assembly including an irrigation pipe supported above the ground on spaced wheels, a stabilizer for preventing movement of the assembly perpendicular to the longitudinal dimension of the pipe, comprising a. an elongated stabilizer arm having a ground-engaging end and a mounting end, b. pivot means engaging the mounting end of the arm and arranged to be secured to the irrigation assembly with the axis of the pivot means extending obliquely with respect to and in a plane substantially parallel to the longitudinal axis of the irrigation pipe, for moving the arm pivotally downward selectively to opposite lateral sides of the pipe for engagement of the ground-engaging end of the arm with the ground, and c. resilient means interengaging the pivot means and arm for urging the arm resiliently to a rest position substantially parallel to the pipe, the resilient resistance of the resilient means being selected to allow movement of the arm from said rest position to said lateral positions against the resistance of said resilient means by a predetermined velocity of wind reacting against the arm.

* * * * *